United States Patent
Kobayashi et al.

(10) Patent No.: US 6,689,443 B2
(45) Date of Patent: Feb. 10, 2004

(54) MAT CONSTRUCTION INCORPORATING RECYCLED CONSTITUENTS AND METHODS OF MANUFACTURE

(75) Inventors: Seiin Kobayashi, Yonezawashi (JP); Thomas D. Nord, Yonezawa (JP); Akihito Suzuki, Kawanishi-machi (JP)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/945,071

(22) Filed: Aug. 31, 2001

(65) Prior Publication Data

US 2003/0044561 A1 Mar. 6, 2003

(51) Int. Cl.[7] .................................................. B32B 3/10
(52) U.S. Cl. .............................. 428/48; 428/47; 428/55; 428/56; 428/89; 428/92; 428/903.3; 15/217; 156/94
(58) Field of Search ............................... 428/44, 47, 48, 428/55, 56, 85, 86, 89–96, 903.3; 15/217; 52/177, 181; 156/94, 98

(56) References Cited

U.S. PATENT DOCUMENTS

| | | | | |
|---|---|---|---|---|
| 4,059,865 A | * | 11/1977 | Schmidt | 15/217 |
| 4,082,874 A | * | 4/1978 | Traylor | 428/54 |
| 5,324,562 A | * | 6/1994 | Mullinax et al. | 428/95 |
| 5,578,357 A | | 11/1996 | Fink | 428/95 |
| 5,728,444 A | | 3/1998 | Fink | 428/97 |
| 6,051,300 A | | 4/2000 | Fink | 428/95 |

* cited by examiner

Primary Examiner—Alexander S. Thomas
(74) Attorney, Agent, or Firm—Terry T. Moyer; Charlotte C. Wilson

(57) ABSTRACT

A dust control mat having a pile surface and a backing layer disposed beneath the pile surface. The pile surface includes segmented portions of pile-forming material salvaged from previously used mat structures and adhered to the backing layer in a predefined arrangement to define a contact surface of recycled material for use in removing dirt from the shoes of a user.

13 Claims, 5 Drawing Sheets

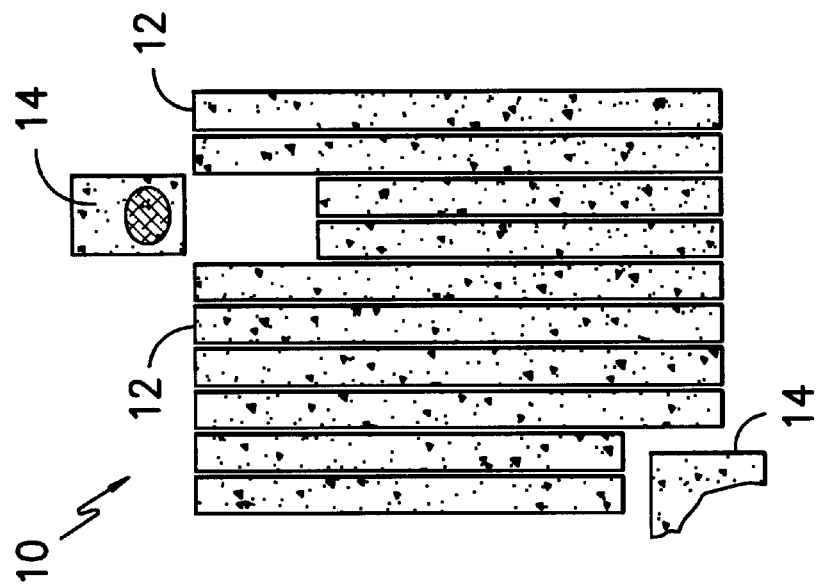
FIG. -2-
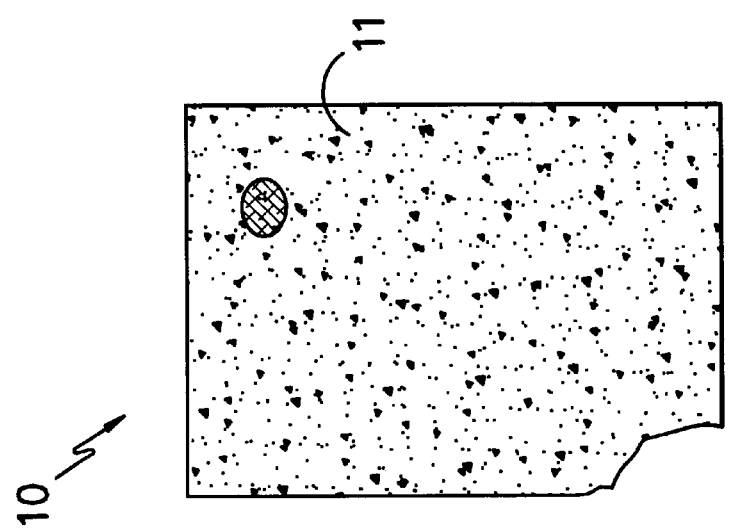
FIG. -1-

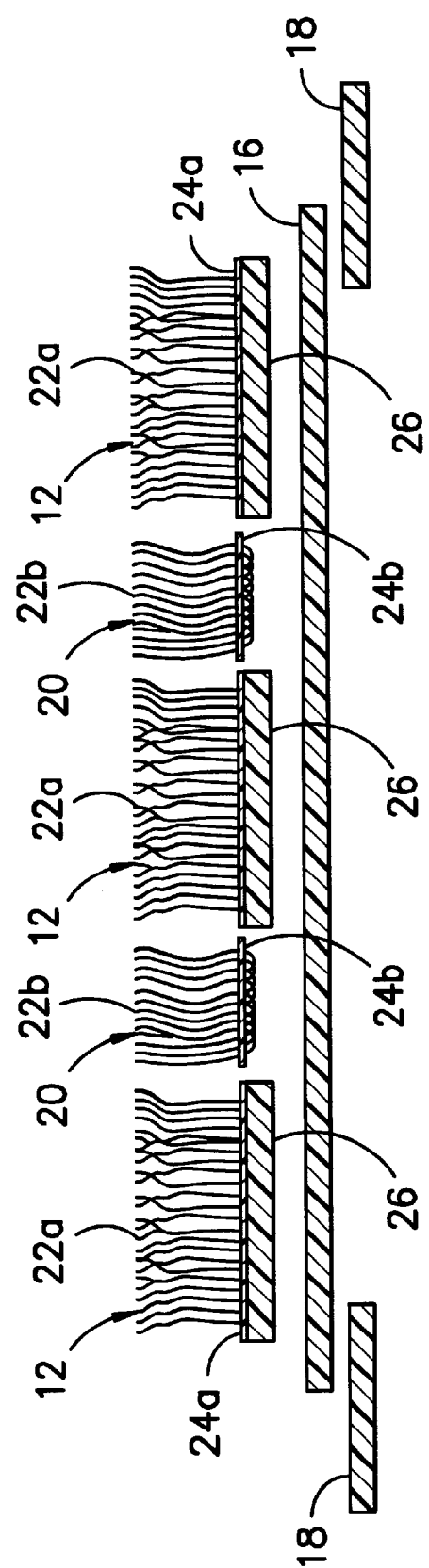
FIG. -3-

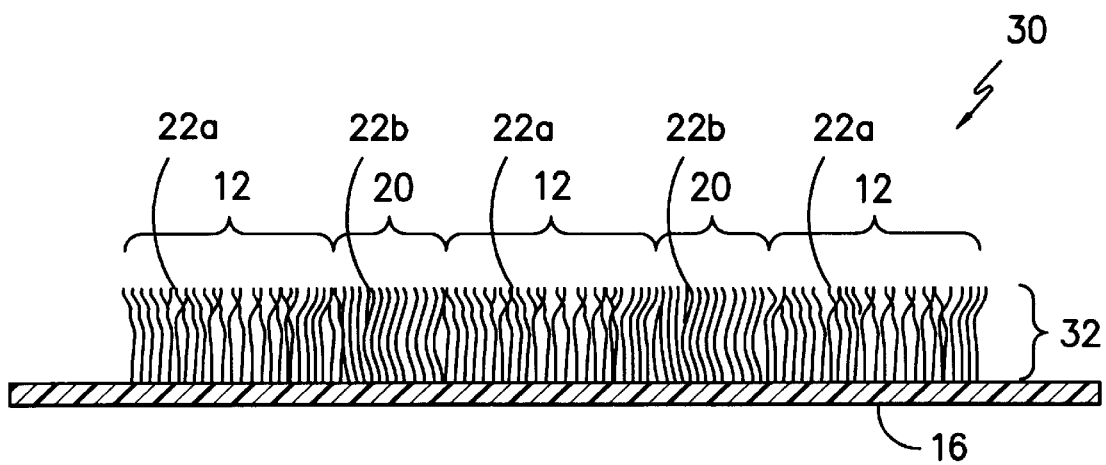
FIG. -4-
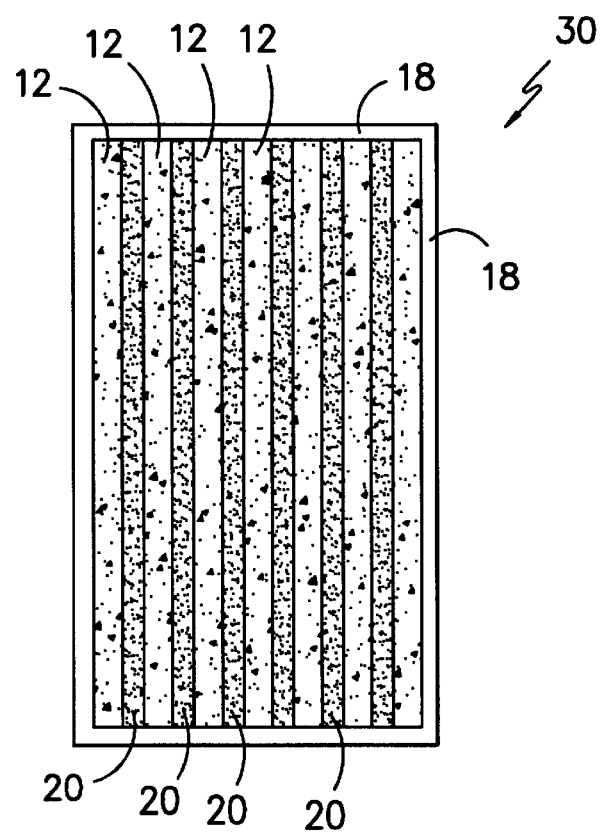
FIG. -5-

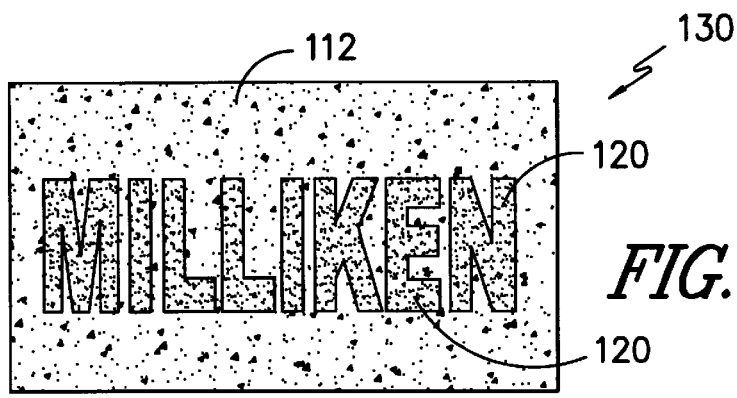
FIG. —6A—
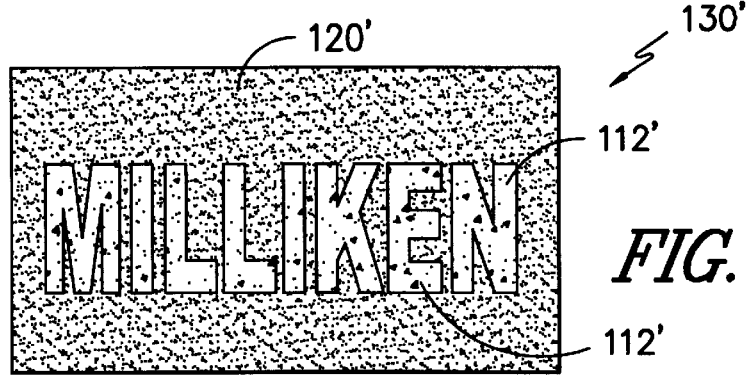
FIG. —6B—
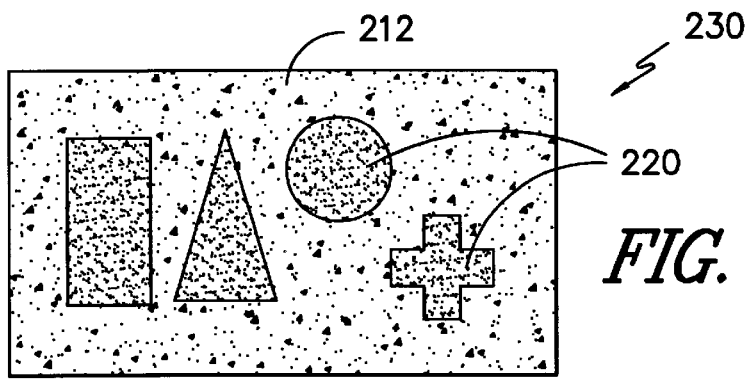
FIG. —7A—
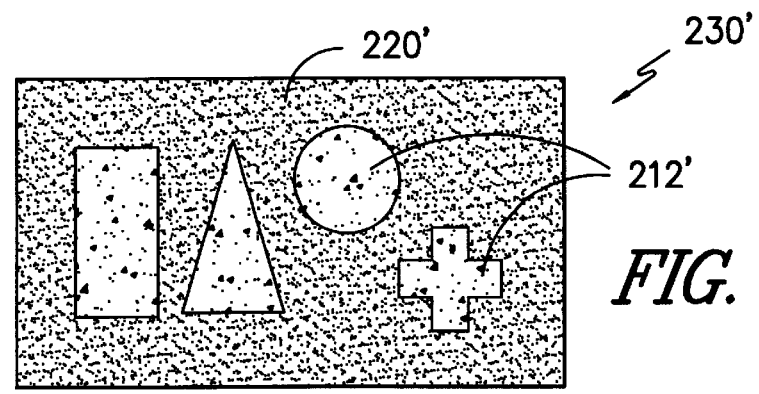
FIG. —7B—

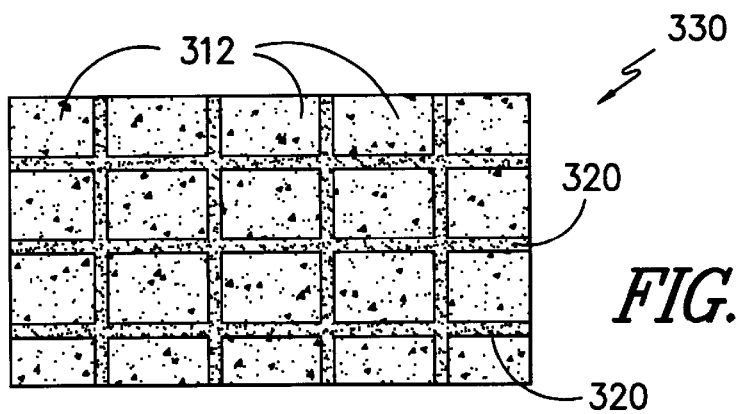
FIG. -8A-
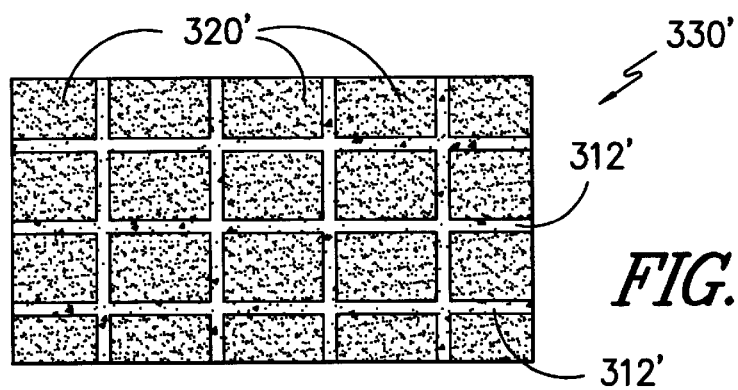
FIG. -8B-
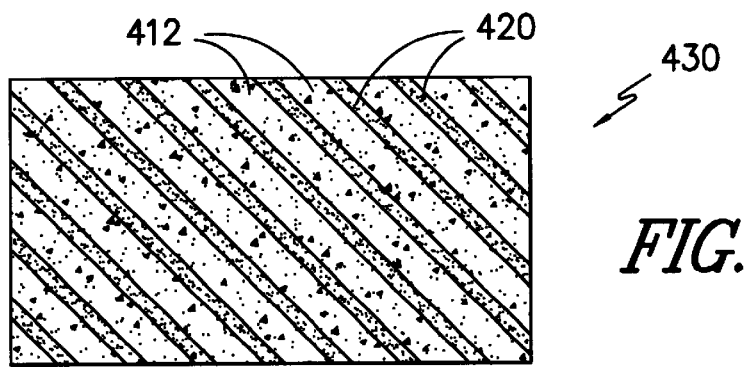
FIG. -9A-
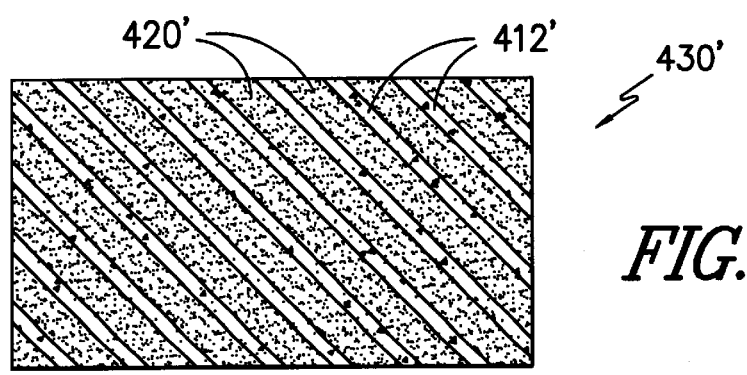
FIG. -9B-

MAT CONSTRUCTION INCORPORATING RECYCLED CONSTITUENTS AND METHODS OF MANUFACTURE

FIELD OF THE INVENTION

The present invention relates generally to launderable dust control floor mats and methods. More particularly, the present invention relates to a dust control floor mat incorporating segmented sections of previously used dust control floor mats to form a pile surface in a floor mat structure, methods of manufacture, methods of use, and the like.

BACKGROUND OF THE INVENTION

It is well known to utilize dust control mats in locations such as door entry ways to facilitate the removal and collection of debris from the shoes of persons entering a building or other area where floors are to be maintained in a clean state. Such dust control mats typically incorporate a layer of pile-forming textile cover fabric bonded to a backing layer of rubber or rubber-like material in a vulcanizing press mold. By way of example only, one such process for forming a dust control mat is illustrated and described in U.S. Pat. No. 4,886,692 to Kerr et al., the contents of which are incorporated by reference herein. The resulting product has a face surface formed from the pile yarns of the cover fabric for contact by the user and a rear surface formed of the rubber or rubber-like backing material for contacting the flooring surface.

As will be appreciated, dust control mats are required to undergo periodic laundering operations after periods of use. The mats may be cleaned or laundered by a laundry service which removes used, dirty mats from a location and replaces them with freshly laundered mats. Thus, both the pile-forming surface material and the underlying backing material are typically of a sufficiently strong character to withstand multiple laundering operations as well as fairly aggressive use in the form of foot traffic and shoe cleaning by users.

Notwithstanding the generally good performance of dust control mats over an extended useful life, in some instances the mats may be subjected to localized wear, damage, and/or staining at one or more locations across the mat. While such wear, damage, and/or staining may affect only a portion of the mat, the appearance of the entire structure may be adversely affected thereby often necessitating a withdrawal of the affected mat from further service.

The replacement of worn, damaged, or stained mats with new mats is costly to the user and/or the laundry service. Further, the discarding of the worn, damaged, or stained mats in landfills is expensive and may raise environmental concerns.

SUMMARY OF THE INVENTION

The present invention provides advantages and/or alternatives over the prior art by providing a dust control mat formed at least partially from recycled portions of previously used dust control mats which may or may not have been damaged or stained.

According to one aspect of the present invention, a dust control mat is provided incorporating a pile-forming surface layer at least a portion of which is formed from segments of previously used dust control mats. The pile-forming surface layer may also include segments of virgin pile material. Both the virgin and previously used surface components may be arranged in a coordinated fashion across a common backing layer and affixed in place across the backing layer by adhesive means or during a vulcanization process so as to establish a coordinated structure.

According to one potentially preferred aspect of the present invention, a dust control mat structure is provided including a pile-forming surface layer of arranged segments of recycled mat material arranged intermittently with virgin pile-forming material. The yarns forming the exterior surface of the recycled mat material may be of either similar or dissimilar character to the yarns within the virgin pile-forming material to achieve desired appearance and performance characteristics.

According to a further aspect of the present invention, a process for forming a dust control mat from recycled portions of previously used dust control mats is provided. In such a process, portions of previously used dust control mats may be arranged in a coordinated fashion with other segments of material across a rubber or rubber-like backing sheet and thereafter fused or adhesively bonded to the rubber backing sheet to yield a coordinated structure. The segments of recycled mat material may be in virtually any geometric form as may provide desired coverage across the underlying backing layer. The material utilized to form the pile surface of the resulting mat structure may be either completely recycled material or may incorporate segments of recycled material in combination with cooperating segments of virgin pile-forming surface material.

The present invention is believed to permit the extended use of undamaged portions of previously used dust control mats thus reducing the amount of waste which must be discarded upon the occurrence of a damaging or staining event as well as reducing the raw material requirements for forming the mat. Accordingly, it is believed that the present invention provides a useful advantage over the prior art.

BRIEF DESCRIPTION OF THE DRAWINGS

The present invention will now be described by way of example only, with reference to the accompanying drawings which constitute a part of the specification herein and in which:

FIG. 1 is a top plan representation of a used dust control mat including a torn portion and a localized stain;

FIG. 2 is a top plan view illustrating the dust control mat of FIG. 1 upon segmentation and removal of the damaged and stained portions;

FIG. 3 is an exploded side assembly view illustrating one arrangement of new and previously used mat-forming materials for use in construction of a dust control mat according to the present invention;

FIG. 4 is a representative side view of the dust control mat resulting from assembly of the components illustrated in FIG. 3;

FIG. 5 is a top plan view of the pile surface of the dust control mat illustrated in FIG. 4;

FIGS. 6A and 6B are top plan views that illustrate arrangements of new and recycled mat-forming materials to define surface messages across a dust control mat according to alternate embodiments of the present invention;

FIGS. 7A and 7B are top plan views that illustrate patterning arrangements of new and recycled mat-forming materials to create surface patterns of defined geometry across dust control mats according to alternate embodiments of the present invention;

FIGS. 8A and 8B are top plan views that illustrate an alternative arrangement of new and recycled mat-forming materials across the surface of a dust control mat according to alternate embodiments of the present invention; and FIGS. 9A and 9B are top plan views that illustrate yet other alternative arrangements of new and recycled mat-forming materials across the surface of a dust control mat according to the present invention.

While the invention has been illustrated and generally described above and will hereinafter be described in connection with certain potentially preferred embodiments, procedures and practices, it is to be understood that in no event is the invention to be limited to such illustrated and described embodiments, procedures and practices. On the contrary, it is intended that the present invention shall extend to all alternatives and modifications as may embrace the principles of this invention within the true spirit and scope thereof.

DESCRIPTION OF PREFERRED EMBODIMENTS

Turning now to the drawings wherein to the extent possible like reference numerals have been used to designate like components throughout the various views, in FIG. 1 there is illustrated the pile surface 11 of a damaged and stained dust control mat 10 such as may be typically used at the entrance to a building or in a like environment wherein a dust control mat is used for applications such as cleaning the shoes of pedestrians. As shown, a substantial portion of the dust control mat 10 remains substantially intact although the overall appearance and functionality is compromised by the torn and stained portions.

As illustrated in FIG. 2, in accordance with one potentially preferred procedure of the present invention, the used dust control mat 10 is cleaned or laundered, and then dried, segmented into a multiplicity of discrete, elongate, used mat segments 12. While the used mat segments 12 are illustrated as being of a generally elongate geometry of substantially uniform width such as may be easily formed by industrial equipment, virtually any other segmentation geometry may likewise be utilized as may be desired. Such segmentation may be carried out by a shearing apparatus as well as by other techniques including die cutting, laser cutting or hand-held blade cutting as will be well known to those of skill in the art. During the segmentation procedure, discard portions 14 including damaged and/or stained regions are preferentially removed to be discarded. The remaining used mat segments 12 are thus of a substantially clean and undamaged character. It has been found that these segments may be used in the formation of the surface of a new dust control mat 30 in a manner as will now be described.

As illustrated in FIG. 3, the used mat segments 12 may be arranged in a coordinated fashion across one side of a common backing layer 16. Border strips 18 may be aligned in outboard relation beneath the borders of the backing material 16 so as to provide enhanced tear resistance in those regions. However, it is likewise contemplated that such border strips 18 may be eliminated if desired. It is contemplated that the backing layer 16 and border strips 18 are preferably formed of a rubber composition such as acrylonitrile-butadiene rubber (NBR), styrene-butadiene rubber (SBR), carboxilated NBR, chlorinated rubber, silicone containing rubber, EPDM and the like. Such rubbers may be dense in nature or may include a blowing agent to yield a reduced specific gravity with controlled expansion characteristics as described in U.S. Pat. No. 5,305,565 to Nagahama et al. (incorporated herein by reference). The rubber may have a closed cell or open cell structure.

Other materials may also be used to form the backing layer 16 and border strips 18 if desired. By way of example only, such other materials may be of a generally rubber-like physical character such as vinyl, thermoplastic elastomers (TPE), urethane, latex variants and combinations thereof. The thickness of the new rubber or rubber-like backing layer 16 is preferably in the range of about 0.1 to about 20 mm. Of course other materials such as woven, knitted or non-woven textiles as well as plastic sheeting and the like may also be used to form the backing layer 16 if desired. In such a construction, a layer of resilient adhesive such as a latex adhesive, an adhesive film, or the like may be used to hold the pile-forming materials in place.

As shown, the used mat segments 12 may be arranged across the backing layer 16 in a coordinated arrangement with segments of virgin pile-forming material 20. As shown, both the used mat segments 12 and the virgin pile-forming material 20 include a multiplicity of yarn elements 22a, 22b. The yarn elements 22a, 22b are preferably tufted through a woven or non-woven substrate 24a, 24b of suitable material.

As shown, the used mat segments 12 may include an original backing layer 26 such as a rubber or rubber-like material forming a backing to the original dust control mat 10. However, it is likewise contemplated that such an original backing layer 26 may be removed prior to arrangement across the new backing layer 16. Likewise, while the virgin pile-forming material 20 is illustrated as including no additional backing other than the substrate 24b, it is contemplated that a further backing material such as rubber or rubber-like material compatible with the new backing layer 16 may be present if desired. Thus, it is contemplated that both the used mat segments 12 as well as the virgin pile-forming material 20 may either include or be devoid of a backing layer.

Upon placement of the used and virgin materials across the new backing layer 16, it is contemplated that the various components as illustrated in FIG. 3 may be adjoined to one another to form a substantially unitary coordinated structure (30, FIGS. 4 and 5). By way of example only, in the event that the new backing layer 16 is a green or unvulcanized rubber or rubber-like material, it is contemplated that the used mat segments 12, the virgin pile-forming material 20 and the side strips 18 may be molded together in the desired aligned relationship to backing layer 16 by passing the components through a vulcanizing press at a temperature in the range of about 320° F. to about 340° F. for a period of about four (4) minutes causing the mat segments 12, virgin pile-forming material 20, and the side strips 18 to be molded integrally with the backing layer 16. The result, as in FIG. 4, is a recycled mat structure 30 including a pile surface 32 of previously used and virgin pile-forming material disposed in a fixed patterned arrangement.

As illustrated in FIGS. 4 and 5, the recycled mat structure 30 includes a surface pattern of used mat segments 12 arranged in a coordinated pattern with virgin pile-forming material 20 across a common backing layer 16. It is to be understood, that while the arrangement illustrated in FIG. 5 is made up of alternating strips of used mat segments 12 and virgin pile-forming material 20, that virtually any other coordinated arrangement may likewise be utilized as desired. Moreover, it is also contemplated that in some instances the recycled mat structure 30 need not incorporate virgin pile-forming material 20. That is, it is contemplated that the entire pile-forming surface 32 may be made up of used mat segments 12 if desired without intervening virgin pile-forming material 20.

The ability to selectively combine used and virgin pile forming materials across a recycled mat structure 30 provides a substantial number of manufacturing alternatives. In FIG. 6A, a recycled mat structure 130 is illustrated wherein used mat material 112 surrounds an arrangement of segments or portions of virgin pile-forming material 120 across a common backing to define a written message across the surface of the recycled mat structure 130. Likewise, in FIG. 6B, there is illustrated a recycled mat structure 130' wherein virgin pile-forming material 120' surrounds an arrangement of used mat segments or portions 112' across a common backing to define a written message across the surface of the recycled mat structure 130'. This written message may be comprised of numbers, symbols, or letter or characters of any language.

In addition to written messages, it is contemplated that virtually any desired geometric pattern as well as designs, logos, or the like, may be established by a selective combination of used mat material segments or portions and virgin pile-forming material, segments or portions. By way of example only, and not limitation, in FIG. 7A, a mat structure 230 is illustrated wherein an arrangement of geometric patterns formed by virgin pile-forming material 220 are disposed within a background of used mat material 212. Likewise, as illustrated in FIG. 7B, a mat structure 230' may be provided wherein used mat segments 212' are arranged within a background of virgin pile-forming material 220'.

It is contemplated that used mat segments may be arranged in combination with virgin pile-forming material in any number of geometric arrangements across the surface of a mat structure according to the present invention. By way of example only, and not limitation, in FIG. 8A, there is illustrated a recycled mat structure 330 wherein segments of virgin pile-forming material 320 are arranged in a lattice pattern with rectangular used mat segments 312 arranged at the interstices between the segments of virgin pile-forming material 320. Likewise, in FIG. 8B, there is illustrated a recycled mat structure 330' wherein used mat segments 312' are arranged in a lattice-like geometry with virgin pile-forming material 320' occupying the interstices between the lattice elements.

Still another arrangement of materials is illustrated in FIG. 9A. In this arrangement, a recycled mat structure 430 is provided wherein used mat segments 412 are arranged diagonally in a cross-hatch orientation with strips of virgin pile-forming material 420 across a common backing. In like manner, in FIG. 9B, there is illustrated a recycled mat structure 430' wherein the relative position and size of the components in FIG. 9A is reversed such that the pile surface of the recycled mat structure 430' is formed predominantly from strips of virgin pile-forming material 420' with interposed relatively narrow strips of used mat segment material 412'.

It will be appreciated that the striped surface arrangement illustrated in FIG. 5, the lattice-type surface arrangement illustrated in FIGS. 8A and 8B and the cross-hatch surface arrangements illustrated in FIGS. 9A and 9B are illustrative and exemplary only as exhibiting potentially useful and aesthetically pleasing arrangements of used and virgin pile-forming materials across common backings. It is of course to be understood that virtually any other arrangement of virgin and recycled pile-forming materials may be utilized if desired.

As previously indicated, the yarn elements 22a and 22b in the used mat segments 12 and virgin pile-forming material 20 respectively may be of either similar or dissimilar character. It has been found that the utilization of dissimilar yarn elements across the surface of the recycled mat structure may provide both aesthetic as well as functional benefits in some applications.

According to one practice, the yarn elements 22b within the virgin pile-forming material 20 may be a mono-filament yarn of a relatively coarse construction having a linear density in the range of about 100 to about 5,000 denier per filament and most preferably about 100 to about 2,000 denier per filament. As will be appreciated, such coarse mono-filament yarns may facilitate the scraping removal of dirt and other debris from a user's shoe at their location of occurrence. Accordingly, by patterning the virgin pile-forming material 20 with such mono-filament yarns therein across the surface of the mat structure, a surface pattern of scraping elements may be established. Of course, it is also contemplated that fine fibers such as multi-filament yarn may also be utilized. Such fine fibers may have filament linear densities in the range of about 0.1 to about 100 denier per filament and more preferably about 1 to about 50 denier per filament with about 60 filaments per yarn.

The yarn elements 22a and 22b may also be of either similar or dissimilar chemical structure. In this regard, potentially preferred yarn materials may include polyester, polypropylene, nylon, acrylic, cotton, wool, and combinations thereof. Such yarn elements may be dyed or undyed depending upon desired surface characteristics. Moreover, it is contemplated that the coloration of the used mat segments 12 may be either the same or different from the coloration of the virgin pile-forming material 20 so as to provide desired color schemes across the pile surface. If dyed, the yarn elements 22a, 22b may be space dyed, solution dyed, atmospherically dyed, pressure dyed, yarn dyed, injection dyed, or dyed by any other technique and practice as may be known to those of skill in the art.

Surprisingly, it has been found that the utilization of virgin pile-forming material 20 interspersed across the surface of the recycled mat structure 30 reduces any perception of variation between the discrete segments of used mat material 12 across the surface. That is, the virgin pile-forming material 20 provides a break-up pattern between used mat segments 12 which are similar but which may not be identical. It is believed that the presence of the breakup has a blending effect such that the used mat segments of slightly different shading, from different mats, or the like, in fact appear to be substantially identical, thereby providing an aesthetically pleasing appearance.

It is contemplated that the used mat segments 12 may form virtually any desired percentage of the recycled mat structure 30. However, the recycled mat structure 30 preferably encompasses a relatively high percentage of recycled material such that used mat segments 12 make up not less than about fifteen percent by weight of the recycled mat and more preferably make up about forty-five percent by weight or greater of the recycled mat 30 and most preferably make up about sixty-five percent by weight or greater of the recycled mat 30. Of course, once formed, the recycled mat may be subjected to any desired coloration treatment including but not limited to bulk or patterned dyeing as will be well known to those of skill in the art.

In accordance with the embodiment of the invention, a dust control mat having a pile surface and a backing layer disposed beneath the pile surface. The pile surface includes segmented portions of pile-forming material salvaged from previously used mat structures and adhered to the backing layer in a predefined arrangement to define a contact surface of recycled material for use in removing dirt from the shoes of a user.

While the present invention has been illustrated and described in relation to certain potentially preferred embodiments and practices, it is to be understood that the illustrated and described embodiments and practices are illustrative only and that the present invention is in no event to be limited thereto. Rather, it is fully contemplated that modifications and variations to the present invention will no doubt occur to those of skill in the art upon reading the above description and/or through practice of the invention. It is therefor intended that the present invention shall extend to all such modifications and variations which incorporate the broad aspects of the present invention within the full spirit and scope of the following claims and all equivalence thereto.

What is claimed is:

1. A dust control mat comprising: a pile surface and a backing layer disposed beneath the pile surface, wherein the pile surface comprises segmented portions of previously used mat structures arranged across the backing layer in combination with segments of virgin pile-forming material and wherein the segmented portions of previously used mat structures and segments of virgin pile-forming material are adhered in a predefined fixed positional relation across the backing layer, the segmented portions of previously used mat structures comprising a plurality of pile yarns of kinked, frayed texture indicative of multiple launderings relative to the segments of virgin pile-forming material such that in an as-constructed condition the texture of the pile surface varies across the mat in a predefined pattern corresponding to the pattern of the segmented portions of previously used mat structures and the segments of virgin pile-forming material and wherein at the location of at least a percentage of the segmented portions of previously used mat structures the backing layer comprises a layer of rubber material pre-applied to said segmented portions of previously used mat structures vulcanized to at least a second discrete layer of rubber material such that the backing layer at the location of said segmented portions of previously used mat structures comprises at least two layers of rubber material.

2. The dust control mat as recited in claim 1, wherein said segmented portions of previously used mat structures make up not less than about 15% by weight of the dust control mat.

3. The dust control mat as recited in claim 1, wherein said segmented portions of previously used mat structures make up not less than about 45% by weight of the dust control mat.

4. The dust control mat as recited in claim 1, wherein said segmented portions of previously used mat structures make up not less than about 65% by weight of the dust control mat.

5. The dust control mat as recited in claim 1, wherein the backing layer comprises a rubber material selected from the group consisting of NBR, SBR, carboxilated NBR, EPDM, chlorinated rubber and silicone containing rubber.

6. The dust control mat as recited in claim 5, wherein the backing layer has a thickness of about 20 mm or less.

7. The dust control mat as recited in claim 1, wherein the backing layer is a polymeric material selected from the group consisting of vinyl, thermoplastic elastomers, urethane, latex variants and combinations thereof.

8. The dust control mat as recited in claim 7, wherein the backing layer has a thickness of about 20 mm or less.

9. A dust control mat comprising: a pile surface and a rubber backing layer disposed beneath the pile surface, wherein the pile surface comprises segmented portions of previously used mat structures including a first set of yarn elements arranged across the backing layer in combination with segments of virgin pile-forming material including a second set of yarn elements and wherein the segmented portions of previously used mat structures and segments of virgin pile-forming material are held integrally within the backing layer in a predefined fixed positional relation across the backing layer, the first set of yarn elements comprising a plurality of pile yarns of kinked, frayed texture indicative of multiple launderings relative to the second set of yarn elements such that in an as-constructed condition the texture of the pile surface varies across the mat in a predefined pattern corresponding to the pattern of the segmented portions of previously used mat structures and the segments of virgin pile-forming material and wherein at the location of at least a percentage of the segmented portions of previously used mat structures the backing layer comprises a layer of rubber material pre-applied to said segmented portions of previously used mat structures vulcanized to at least a second discrete layer of rubber material such that the backing layer at the location of said segmented portions of previously used mat structures comprises at least two layers of rubber material.

10. The dust control mat as recited in claim 9, wherein the first set of yarn elements is dissimilar in construction to the second set of yarn elements.

11. The dust control mat as recited in claim 10, wherein the first set of yarn elements comprise multi-filament yarns having a filament linear density of about 1 to about 50 denier per filament and wherein the second set of yarn elements comprise mono-filament yarns having a filament linear density of about 100 to about 5000 denier per filament.

12. The dust control mat as recited in claim 9, wherein the first set of yarn elements and the second set of yarn elements are each formed from materials selected from the group consisting of polyester, polypropylene, nylon, acrylic, cotton, wool, and combinations thereof.

13. A dust control mat comprising: a pile surface and a rubber backing layer disposed beneath the pile surface, wherein the pile surface comprises segmented portions of previously used mat structures including a first set of yarn elements arranged across the backing layer in combination with segments of virgin pile-forming material including a second set of yarn elements and wherein the segmented portions of previously used mat structures and segments of virgin pile-forming material are held integrally within the backing layer in a predefined fixed positional relation across the backing layer, the first set of yarn elements comprising a plurality of pile yarns of kinked, frayed texture indicative of multiple launderings relative to the second set of yarn elements such that in an as-constructed condition the texture of the pile surface varies across the mat in a predefined pattern corresponding to the pattern of the segmented portions of previously used mat structures and the segments of virgin pile-forming material and wherein at the location of at least a percentage of the segmented portions of previously used mat structures the backing layer comprises a layer of rubber material pre-applied to said segmented portions of previously used mat structures vulcanized to at least a second discrete layer of rubber material such that the backing layer at the location of said segmented portions of previously used mat structures comprises at least two layers of rubber material wherein the first set of yarn elements is substantially similar in construction and coloration to the second set of yarn elements.

\* \* \* \* \*